United States Patent
Yoshikawa et al.

[15] 3,704,048
[45] Nov. 28, 1972

[54] METAL BEARING INSERT

[72] Inventors: Kengi Yoshikawa, Nagoya; Etsuo Hayashi, Nishinomiya, both of Japan

[73] Assignees: Sumitomo Electric Industries, Ltd., Osaka; Goshi Kaisha Yoshikawa Seimitsu Kohsakusho, Nagoya-shi, Japan; part interest to each

[22] Filed: Nov. 10, 1970

[21] Appl. No.: 88,430

[30] Foreign Application Priority Data

Nov. 10, 1969 Japan ..................44/89922

[52] U.S. Cl. ...................................308/72, 308/237
[51] Int. Cl. .............................................F16c 25/04
[58] Field of Search.............308/237, 72, 73, 37, 121

[56] References Cited

UNITED STATES PATENTS

| | | |
|---|---|---|
| 3,318,642 | 5/1967 | Peterson..................308/72 X |
| 1,384,173 | 7/1921 | Wikander....................308/73 |
| 2,851,314 | 9/1958 | Thomson..................308/72 X |
| 2,964,363 | 12/1960 | Daykin et al. .............308/121 |
| 3,223,464 | 12/1965 | Hoddy et al. ................308/72 |
| 3,473,060 | 10/1969 | Powell ...................308/237 R |

Primary Examiner—Milton Kaufman
Assistant Examiner—Barry Grossman
Attorney—Sughrue, Rothwell, Mion, Zinn & Macpeak

[57] ABSTRACT

A metal bearing comprises a thin cylindrical portion having a bearing hole formed at the center, a collar formed concentrically around it, and three radial legs coupled to the cylindrical portion and said collar.

1 Claim, 4 Drawing Figures 3,704,048

INVENTORS
KENGI YOSHIKAWA
ETSUO HAYASHI

Sughrue, Rothwell, Mion,
BY Zinn & Macpeak

ATTORNEYS

METAL BEARING INSERT

BACKGROUND OF THE INVENTION

1. Field of the Invention

This invention relates to a metal bearing adapted to be installed under pressure in a metal bearing engaging hole.

2. Description of the Prior Art

The conventional metal bearing such as, for example, a bearing for an upper shaft in the head of a sewing machine, is cylindrical, and has a collar projecting from one end thereof, as a stopper upon press-fitting thereof so that it may be press-fitted into a bearing engaging hole. If the conventional bearing has a smaller outer diameter than the inner diameter of bearing engaging hole so that it may be inserted loosely therein, a setscrew is screwed into a radial hole extending through the wall of the bearing that is pressed into the screw receiver provided on the outer periphery of the bearing so as to fix it thereto. On the other hand, if the bearing has a larger outer diameter than the inner diameter of the engaging hole, since the cylindrical bearing is strong relative to the compression applied from the outer periphery thereof, so that the deformation thereof due to compression is very small, it sometimes becomes difficult to insert the bearing into the engaging hole, since the outer diameter of the bearing metal is slightly larger than the inner diameter of the metal engaging hole. Further, when a belt is engaged with the shaft supported by the bearing so that a load is applied to the shaft, the result is that the shaft leans to one side, and the shaft contacts one point of the bearing so that when the shaft rotates it fluctuates and becomes unstable.

SUMMARY OF THE INVENTION

The present invention eliminates the aforementioned disadvantages of the conventional bearings, and provides a novel and improved metal bearing which may be press-fitted into the bearing engaging hole even if the bearing has larger outer diameter than the inner diameter of the metal engaging hole and may deform slightly due to the press-fit thereof. Thus, the shaft may contact the bearing at three points so as to stably support the same in order to prevent the fluctuation of the shaft.

It is an object of the present invention to provide a bearing which may be lighter in assembly than a conventional metal bearing.

It is another object of the invention to provide a metal bearing which may be easily manufactured with less material than that of a conventional metal bearing.

It is a further object of the invention to provide a metal bearing which may contain lubricating oil so that it is not necessary to supply lubricating oil during usage.

It is still another object of the invention to provide a metal bearing which is adapted for mass production.

According to one aspect of the present invention, there is provided a metal bearing which comprises a thin, cylindrical portion having a bearing hole formed at the center thereof, a collar concentrically surrounding said cylindrical portion, and three legs radially coupled to said cylindrical portion and said collar.

BRIEF DESCRIPTION OF THE DRAWINGS

The other objects, features and advantages of the present invention will become apparent from the following description taken in conjunction with the accompanying drawings, in which.

DESCRIPTION OF THE PREFERRED EMBODIMENT

Figure 1:
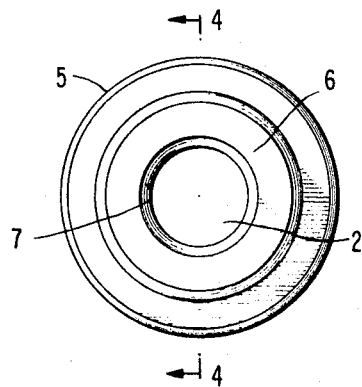
FIG. 1 is a front view of one embodiment of the metal bearing constructed according to the present invention.

Reference is now made to the drawings, which shows one embodiment of the present invention, which embodiment is a metal bearing integrally molded of a sintered iron alloy. Reference numeral 1 illustrates a thin cylindrical portion defining a bearing hole 2 at the center of the metal bearing. Three legs 3 extend radially outwardly of the same sectional form equidistantly with each other between the cylindrical portion 1 and a collar 5. The outer peripheral surfaces 4 of the respective legs 3 forms circular or arcuate surfaces coaxial with the cylindrical portion 1 of a predetermined diameter. Collar 5 for stopping the axial press-fit of the cylinder has a larger diameter than the outer diameter of the legs 3 extending from the peripheral surface of the cylindrical portion 1 and is connected to the respective legs 3. 6 depicts an expanded portion of the front surface of the collar 5 at the center thereof. An oblique fillet surface 7 is provided on the peripheral surface of the respective open ends at both the front and rear of the bearing hole 2 of the bearing metal.

Figure 2:
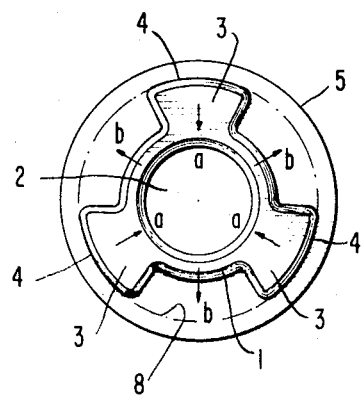
FIG. 2 is a rear view of the bearing shown in FIG. 1.
Figure 3:
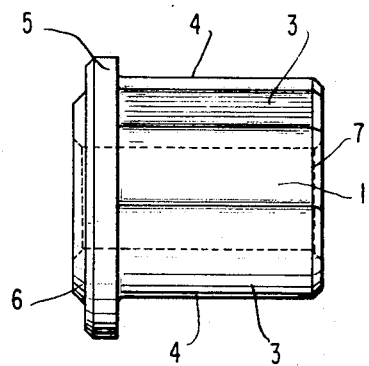
FIG. 3 is a side view of the bearing shown in FIG. 1.
Figure 4:
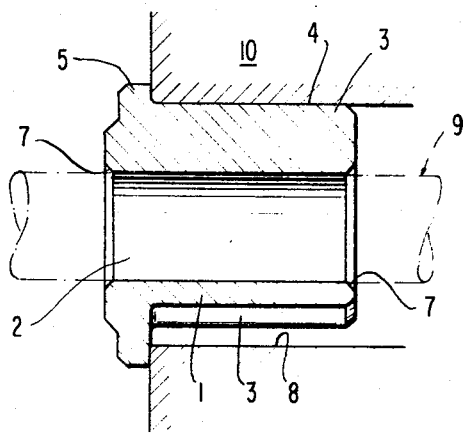
FIG. 4 is a longitudinal side section of the metal bearing taken along the line 4—4 in FIG. 1.

The metal bearing of this invention is employable for assembly in the head of a sewing machine, and the outer diameters of the legs 3 are slightly larger than the inner diameter of the metal bearing engaging hole formed in the arm head 10 of the sewing machine, so that the legs 3 are press-fitted into the metal bearing engaging hole 8. The outer peripheral surfaces 4 of the respective legs 3 are press-fitted within the inner wall of the metal engaging hole 8 by such a press-fit, that the legs 3 are pressed inwardly as shown by the arrows in FIG. 2, with the result that the thin cylindrical portion 1 slightly deforms and portions $a$ of the respective legs 3 deform inwardly while portions $b$ thereof deforms outwardly, FIG. 2, so that the inner peripheral surface of the bearing hole 2 deforms from its circular section.

If the shaft 9 is inserted into the present bearing metal thus press-fitted into the metal engaging hole 8 to be in operation for supporting the shaft, the shaft 9 in the bearing hole 2 particularly contacts portions $a$ of the respective legs 3 inwardly displaced of the cylindrical portion 1 at three points so that the axis of the shaft 9 is held at the position of the axis of the cylindrical portion 1 of the metal bearing. The result is that even if the shaft 9 is rotated, it may not fluctuate so as to rotate stably. The fluctuation of the arm head occurring due to the fluctuation of the shaft is thereby prevented. Readily, lubricating oil is supplied to the gap between the inner periphery of the thin portions $b$ of the cylindrical portion 1 outwardly expanded and the shaft 9 and then to the contacting portion between the bearing hole 2 and the shaft 9.

The metal bearing of this invention has radially outwardly projecting legs at the outer periphery of the thin cylindrical portion, so that the outer peripheral surfaces of the respective legs contact the inner surface of the metal bearing engaging hole and are press-fitted therein with the result that the thin cylindrical portion is deformed so that the outer diameter of the radially outwardly projecting legs in three directions are equidistantly reduced with the result that the legs are easily press-fitted into the metal bearing engaging hole. Thus, the inner surface of the cylindrical portion at three points corresponding to the inside ends of respective legs are displaced inwardly by the deformation of the thin cylindrical portion and contact the rotary shaft supported thereby, so that the rotary shaft is held within the bearing hole in contact at three points. Accordingly, the disadvantages of conventional metal bearings of this type wherein the rotary shaft is displaced in the loading direction so that it contacts unstably the inner surface of the bearing hole at one point, with the resultant shaft fluctuation eliminated. Thus, stable rotation of the rotary shaft supported by the metal bearing of this invention is obtained.

It should be understood from the foregoing description that since the metal bearing of this invention is not formed as a thick cylindrical shape as in conventional metal bearings, it lightens the product in which the metal bearings are assembled over conventional products.

Though the embodiment of this invention is hereinbefore described as to the metal bearing made of a sintered alloy, it may be made of cast iron or a machined product worked from a metal bar material so that it may not be restricted to the material adapted for the bearing metal. However, if it is made of a sintered alloy, it may be easily machined, so that less amount of material may be required in comparison with that of the conventional metal bearing, and if the lubricating oil is immersed therein, oil may not have to be supplied in usage, it may be appropriate for mass production, and particularly for assembling the head of a sewing machine.

What is claimed is:

1. A unitary, solid metal sleeve bearing for press-fitted insertion within a cylindrical hole, said bearing comprising:
   a thin cylindrical portion whose center forms an axial bearing hole, and
   a plurality of integral, equally spaced solid metal radial legs projecting outwardly of said cylindrical portion to a radial extent in excess of the radius of the cylindrical hole receiving the same, said thin cylindrical portion intermediate of said spaced radial legs being deformable radially outwards in response to the compressive forces acting on said legs when said sleeve bearing is inserted in said cylindrical hole and permitting self-alignment of said unitary thin cylindrical portion.

* * * * *